United States Patent [19]

Stanik

[11] Patent Number: 4,746,429
[45] Date of Patent: May 24, 1988

[54] MEMBRANE FILTER PLATE WITH A CARRIER PLATE AND SEALING RIM

[76] Inventor: Reimund Stanik, Bischof-Ketteler-Strasse 10, 8952 Marktoberdorf, Fed. Rep. of Germany

[21] Appl. No.: 865,183

[22] Filed: May 20, 1986

[30] Foreign Application Priority Data

Jun. 10, 1985 [DE] Fed. Rep. of Germany ... 8516901[U]
Apr. 29, 1986 [EP] European Pat. Off. ........ 86105923.6

[51] Int. Cl.$^4$ .............................................. B01D 25/12
[52] U.S. Cl. .................................... 210/231; 210/232
[58] Field of Search ............... 210/231, 230, 229, 227, 210/354, 355, 356, 232

[56] References Cited

U.S. PATENT DOCUMENTS

| 4,166,035 | 8/1979 | Ramsteck ............................ 210/231 |
| 4,508,623 | 4/1985 | Heckl et al. .................... 210/231 X |
| 4,608,164 | 8/1986 | Heu ..................................... 210/231 |

FOREIGN PATENT DOCUMENTS 0081715  11/1982  Euopean Pat. Off. .

*Primary Examiner*—Frank Spear
*Attorney, Agent, or Firm*—Hill, Van Santen, Steadman & Simpson

[57] ABSTRACT

Membrane filter plate for a filter press or the like with a carrier plate and sealing rim, in which the actual membrane and the sealing rim frame are made in one piece from solid plastic and the thus constructed frame membrane is connected to the carrier plate in sealing and self-centering manner.

12 Claims, 3 Drawing Sheets

MEMBRANE FILTER PLATE WITH A CARRIER PLATE AND SEALING RIM

The invention relates to a membrane filter plate with a carrier plate and sealing rim.

BACKGROUND OF THE INVENTION

EP-OS No. 0 081 715 discloses a membrane filter plate of the aforementioned type, which has fundamentally proved satisfactory. The particularly advantageous operation of the membrane chamber filter plate described therein, compared with the previously known or standard membrane filter plates is essentially based on the characteristic construction of the transition region of the bearing face of the carrier plate between the sealing rim and the central region of the carrier plate, as given in connection with the description of the prior art membrane filter plate, because in an optimum manner the mechanical stressing of the membrane is kept low during changes between the pressing and filtration phases and the like. The membranes can be changed in the said membrane filter plate, because the angle screw joints or the screw joints provided in the sealing rim frame pieces can be detached and then tightened again after inserting the new membrane. However, a relatively large amount of alignment and adjustment work is necessary, so that the in situ replacement of membranes by the user or customer is difficult.

The problem of the present invention is therefore to further develop the said prior art membrane filter plate, so as to permit a simple in situ replacement of the membranes in the case of wear and the like, with optimum precision and requiring minimum labour and personnel costs.

SUMMARY OF THE INVENTION

According to the invention, this problem is solved by the characterizing features of the main claim and particularly advantageous embodiments of the invention form the subject matter of subclaims.

Due to the fact that in the invention, the individual membranes are manufactured together with the sealing rim frame from solid plastic in the form of frame membranes (obviously advantageously all the components of the membrane filter plates according to the invention are made from plastic), the individual membranes can be replaced in situ in simple manner by the customer, by loosening the angle screw joints and the screws in the sealing rim frame pieces, which can then be tightened again. As a result of the advantageous characteristic construction of the carrier plate and sealing rim frame with set-back or set-forward steps or stages, the carrier plate not only fulfils the function of receiving sealing rings and the like, but also that of centering the frame membranes, holding the latter in position. Thus, no snap or mating connections are required and instead it is possible to assemble very simply components of different age or with the resulting different degree of shrinkage, because the frame membranes only have to be placed on the carrier plate and then centered on the latter by the preferred centering towards the center of the membrane filter plate and are consequently positively held in position. The drain passages and the like are exclusively provided in the membranes, which leads to a particularly simple carrier plate construction. Apart from their feed and drain functions, all four corner bores are preferably simultaneously used as screw connections for the carrier plate and sealing rim frame, the feed screw joint being realizable both for the passage cloth and the filter cloth screw joint.

In the preferred construction of the inventive membrane filter plate with a rim step and rim slot, the filtration pressure from the central region of the membrane filter plate or carrier plate, which produces a thrust to the outside and which is to be absorbed by the membrane and the connection between the sealing rim frame and the carrier plate is relieved, because the corresponding, outwardly acting forces are absorbed by the rim seal in conjunction with the rim slot and rim step of the carrier plate or the sealing rim frame or frames, accompanied by simultaneous outer centering. Thus, accompanied by simultaneous sealing centering, not only are the outwardly acting forces absorbed in the aforementioned manner, but it is also possible to easily absorb tolerances, which can occur in the case of differing ageing of the individual plastic parts of the membrane filter plate, in that namely the frame membrane 16, 18 to be changed can be readily sealingly adapted by the rim clearance produced, even if there are certain dimensional differences with respect to the remaining carrier plate.

BRIEF DESCRIPTION OF THE DRAWING

Further features and advantages of the invention can be gathered from the following description, in which embodiments are illustrated in detail by means of the diagrammatic drawings, wherein.

DESCRIPTION OF THE PREFERRED EMBODIMENT

Figure 1:
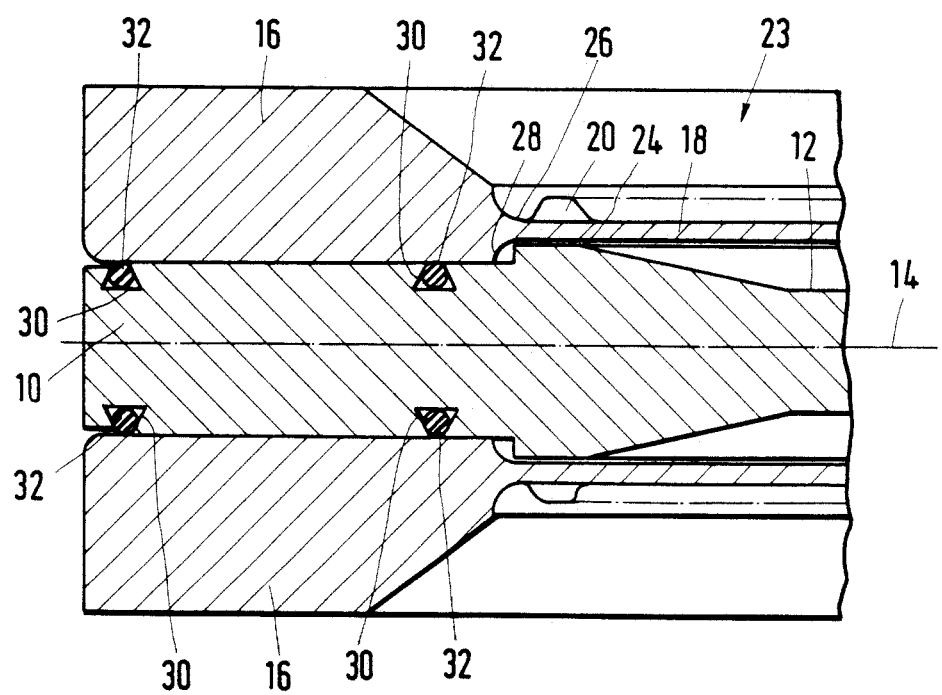
FIG. 1 shows an embodiment of a membrane filter plate according to the invention in section at right angles to the carrier plate median plane in the vicinity of the sealing rim.
Figure 2:
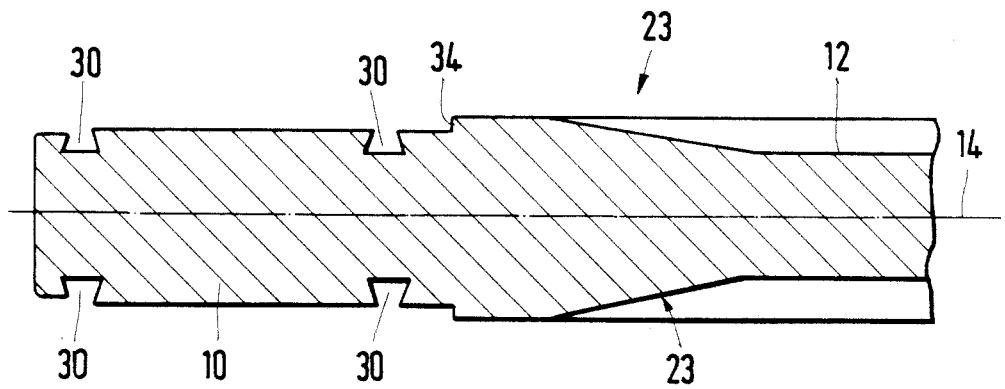
FIG. 2 shows the carrier plate of the membrane filter plate of FIG. 1 in section in the vicinity of the sealing rim in a representation corresponding to FIG. 1.

As shown in FIG. 1, the membrane filter plate has a carrier plate 10 provided in its central region with a substantially planar carrier plate surface 12. On either side of the carrier plate 10, whose median plane is 14, is provided a solid plastic frame membrane, which comprises a sealing rim frame 16 and the actual membrane 18 constructed in one piece therewith and on whose side remote from the carrier plate surface 12 are provided spacing bosses 20, spacing ribs or the like for applying a filter cloth 22 or the like, which is diagrammatically indicated at the bottom left of FIG. 3, but which is not shown in FIGS. 1 and 2. In FIG. 1, membrane 18 is in its fitted unloaded, normal position and forms a substantially flat slab. In the represented embodiment, the engagement face of carrier plate 10 facing membrane 18 runs in the same way as in the membrane filter plate of EP-OS No. 0 081 715, to which reference should be made for further explanation, from the sealing rim frame 16 into a transition region 23 between the sealing rim and the carrier plate surface 12, in such a way that two desired bending lines 24, 26 are formed for the membrane 18, whose significance is also explained in EP-OS No. 0 081 715.

As can further be seen in FIG. 1, on its side facing the carrier plate 10, sealing rim frame 16 is substantially smooth and planar and is provided with a set-back step 28 in the vicinity of the transition region 23. On the engagement surfaces thereof facing the particular sealing rim frame 16, carrier plate 10 has two set-back, trapezoidal sealing slots 30 in all-round manner and in which, as shown in FIG. 1, are inserted sealing rings 32. Close to the transition region 23, carrier plate 10 is provided with a projecting step 34, which is all-round in the same manner as the set-back step 28 of sealing rim frame 16 and into which the latter engages. Thus, the frame membranes 16, 18 are centered with respect to the center of the carrier plate in the manner shown in FIG. 1.

Figure 3:
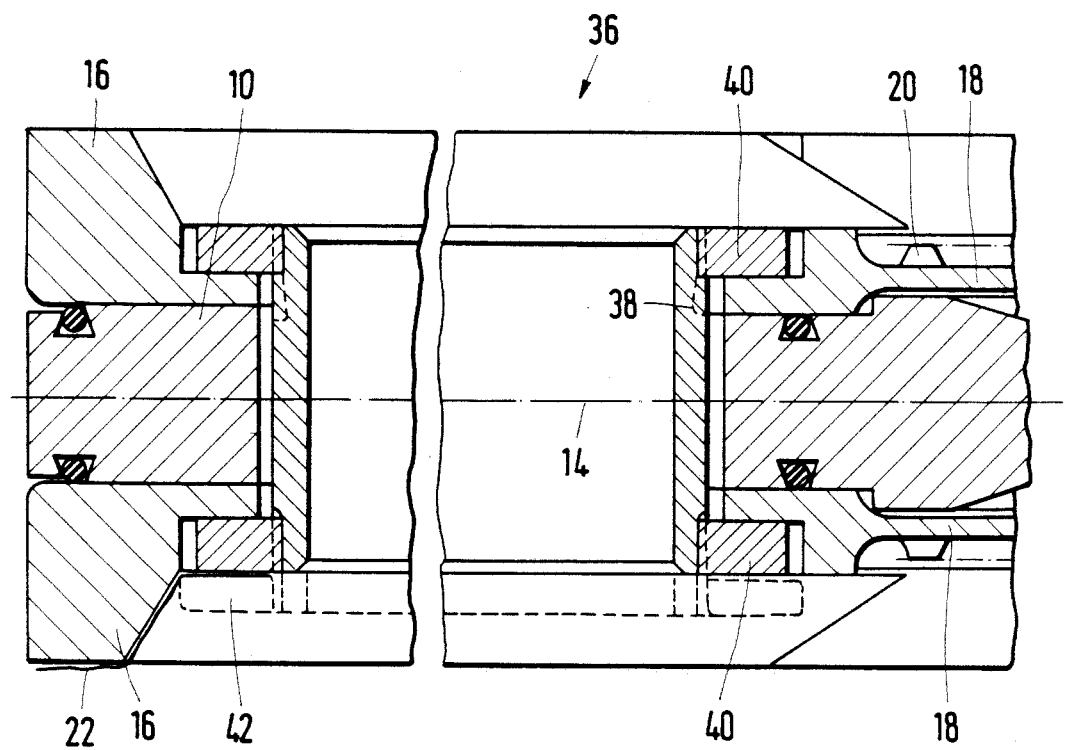
FIG. 3 shows in section at right angles to the carrier plate median plane, a corner intake bore of the membrane filter plate of FIGS. 1 and 2.

All four corners bores of the membrane filter plate according to the invention ae in the represented embodiment constructed as corner feed and corner drain bores and simultaneously for the screw coupling of carrier plate 10 and sealing rim frame 16. FIG. 3 shows a cross-section at right angles to the carrier plate median plane 14 through a corner feed bore 36 which, with a differently formed diameter, traverses both the carrier plate 10 and the sealing rim frame 16. A threaded sleeve 38 projects on either side of correspondingly constructed bearing faces of the sealing rim frame 16 to be screwed onto the carrier plate 10 by corresponding threaded portions, onto which the threaded discs 40 are screwed down under pressure, so as to hold together in fluid-tight manner carrier plate 10 and sealing rim frame 16 by means of the sealing rings 32. The corner feed bores can be constructed both for passage filter cloths and as cloth screw couplings. In the latter case the corner feed bore 36, as shown by broken lines at the bottom of FIG. 3, has a correspondingly extended threaded sleeve 38, onto which is fitted a correspondingly threaded clamping disc 42 of filter cloth 22 following on to the threaded disc 40 serving for pressing together carrier plate 10 and sealing rim frame 16.

Figure 4:
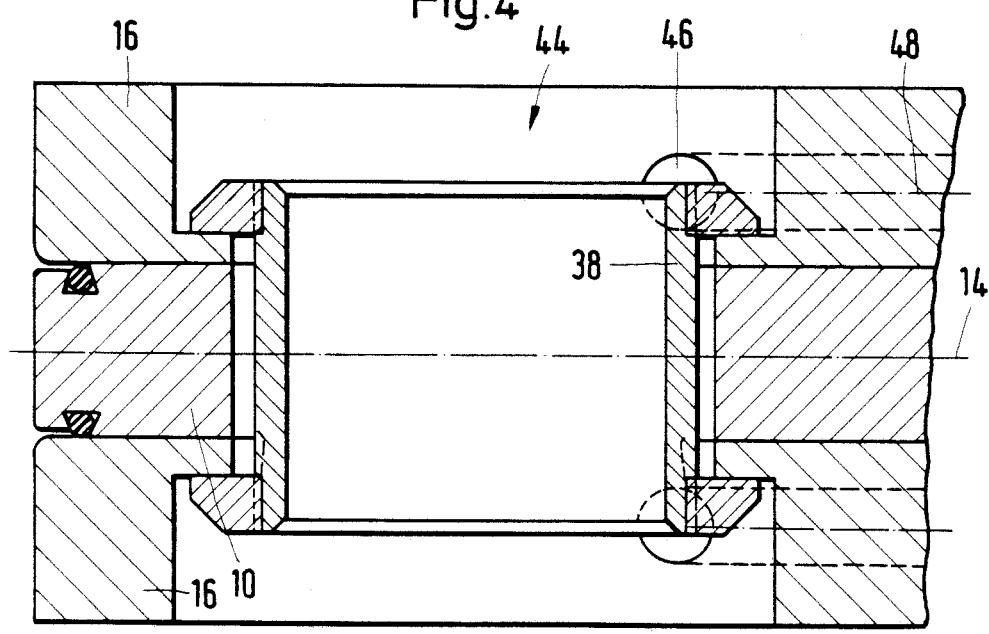
FIG. 4 shows in section at right angles to the carrier plate median plane, a corner drain bore of the membrane filter plate of FIGS. 1 and 2.

FIG. 4 shows a corner drain bore 44, whose inner area communicates via a passage 46, running parallel to the carrier plate median plane 14 and a number of transverse bores 48 with the surface of membrane 18 used for the application of the filter cloth 22 or the like, so that the drain passages run exclusively within the frame membranes 16, 18.

Figure 5:
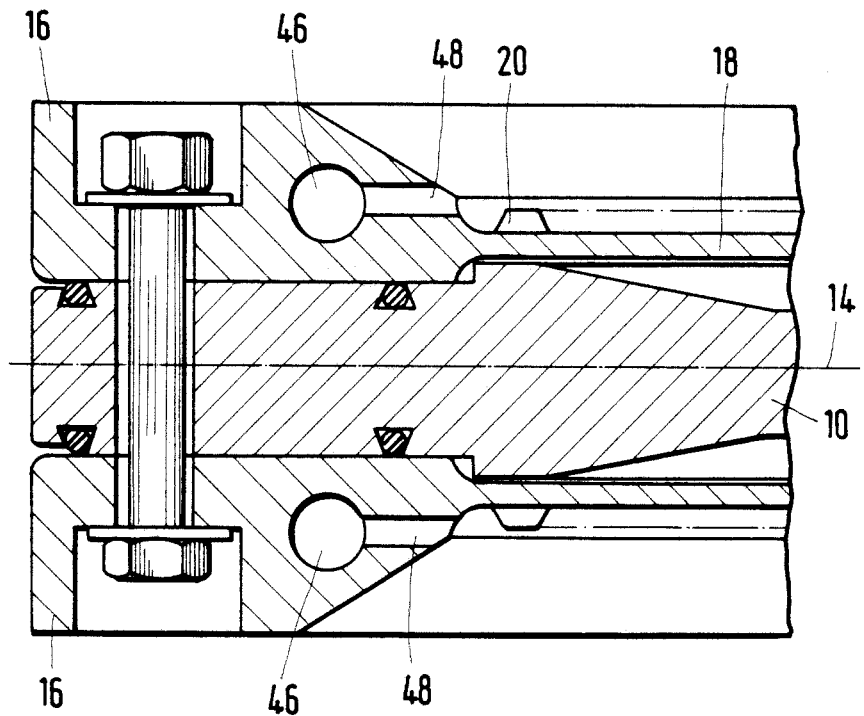
FIG. 5, A section through the membrane filter plate of FIGS. 1 to 4 at right angles to the carrier plate median plane in a region located outside the corner feed and drain bores, drain passages being shown as a further detail not shown in FIG. 1.

In the case of the embodiment shown in FIG. 5, it is possible to see how the all-round passages 46 communicate via the transverse bores 48 with the particular filter chambers, in accordance with FIG. 4 of EP-OS No. 0 081 715. FIG. 4 shows the way in which the drain passages 46 are connected to the internal diameter of the corner drain bores 44.

Figure 6:
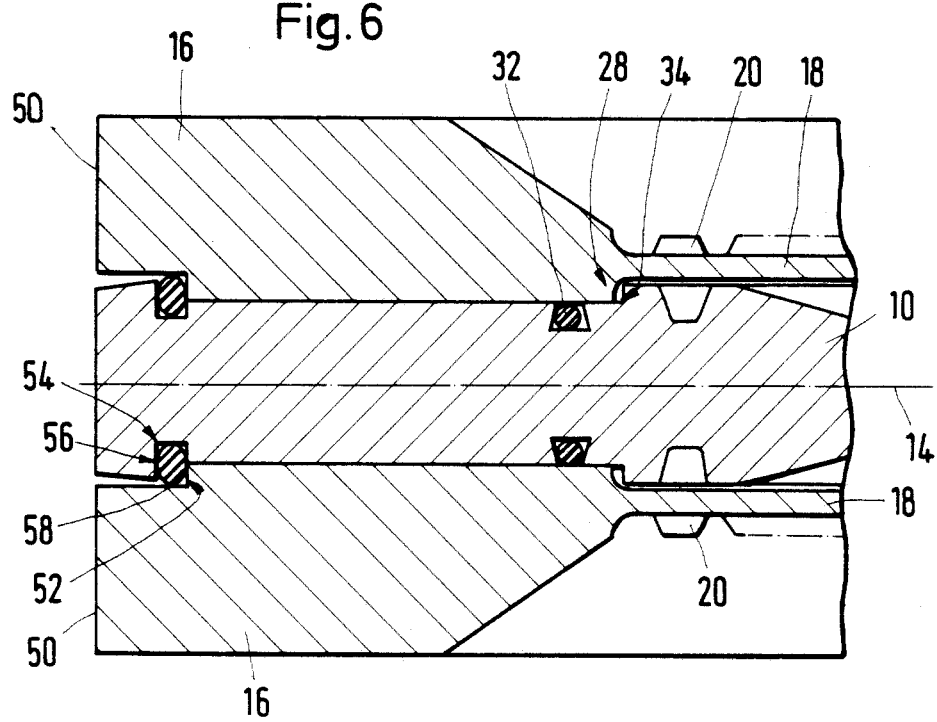
FIG. 6 shows a membrane filter plate embodiment modified compared with that of FIGS. 1 to 5 with outer centering.

In the case of the embodiment of FIG. 6, the sealing rim frame 16 is provided in the vicinity of its circumferential surface 15 on its inner face facing carrier plate 10 with a set-back edge step 52, so that in the area of sealing rim frame connected to the rim step 52 externally when seen from the central region of carrier plate 10 has a smaller thickness than in the area on the rim step 52 in the direction of the central region of carrier plate 10. On its bearing faces facing the sealing rim frame 16, carrier plate 10 has rim slots 54, whose inner wall towards the central region of the carrier plate 10 is substantially aligned with the rim step 52, whilst an outer wall 56 projects in the direction of the inner face of the sealing rim frame 16 to such an extent that it engages behind the particular rim step 52 in the manner shown in FIG. 6. The bearing face of carrier plate 10 then slopes in the direction of the carrier plate median plane 14 from the edge of the outer wall 56 to its circumferential surface aligned with the circumferential surface 50 of sealing rim frame 16.

A rim packing 58, e.g. a sealing ring made from rubber or the like, is inserted in the rim slot 54 and under the action of the pressing or screw pressure holding together frame membranes 16, 18 and carrier plate 10 on the one hand and the outwardly acting filtration pressure on the other can be sealingly pressed against the bottom of rim slot 54 of carrier plate 10 and the outer region, i.e. that region of the inner face of sealing frame 16 outside the rim step 52 towards the circumferential surface 50. This not only leads to an absorption of the outwardly acting forces caused by the filtration pressure and accompanied simultaneously by rim sealing, but also tolerance differences and the like between frame membranes to be replaced and the carrier plate can be easily compensated.

Obviously the above-described and claimed features of the membrane filter plate according to the invention are suitable in conjunction with the remaining features of the membrane filter plate described in EP-OS No. 0 081 715, following corresponding modification, complete reference being made thereto for supplementing the inventive concept.

The inventive features disclosed in the description, the drawings and the claims may be essential either individually or in random combination for realizing the different embodiments of the invention.

I claim:

1. Membrane filter plate for a filter press, with a carrier plate, a membrane arranged on one side of the carrier plate and provided with spacing bosses for the engagement of a filter cloth and a sealing rim surrounding said carrier plate and membrane and joining the same together in a substantially fluid-tight manner, the inner face of the sealing rim parallel to the carrier plate median plane on the side having the membrane being arranged in spaced manner from the membrane plane in the normal unloaded position thereof, the carrier plate engagement surface facing the membrane sloping towards the carrier plate median plane in a transition region between the connecting line of the membrane to the sealing rim and the central region of the carrier plate, in which the latter runs parallel to the carrier plate median plane, whereby the carrier plate bearing surface facing the membrane runs from the connecting line of the membrane to the sealing rim for producing one desired bending line for the filtration or squeezing phase initially substantially parallel to the carrier plate median plane, then slopes at an angle of 3° to 15° towards the same and then extends substantially parallel to the carrier plate median plane over essentially the entire central region of the carrier plate, characterized in that the sealing rim frame (16) and membrane (18) are constructed as a one-piece, plastics material frame membrane (16, 18), and that said frame member is detachably connected with said carrier plate, and that the carrier plate (10) on its side facing the sealing rim frame (16) is constructed with a portion of lesser thickness in the vicinity of the latter and with a projecting step (34) between said portion of lesser thickness and the central region and that the sealing rim frame (16) has a set-back step (28) in the vicinity of the transition region which cooperates with the projecting step (34) for centering the frame membranes (16, 18) with respect to the carrier plate (10).

2. Membrane filter plate according to claim 1, characterized in that the sealing rim frame (16) of the frame membrane (16, 18) on its inner face parallel to the carrier plate median plane (14) and facing carrier plate (10) is substantially planar, and that the carrier plate (10) has on the bearing face facing the sealing rim frame (16) at least one sealing slot (30) with an inserted sealing ring (32).

3. Membrane filter plate according to claim 2, characterized in that the sealing slot (30) is constructed in set-back trapezoidal manner.

4. Membrane filter plate according to claim 2, characterized in that the rim slot (54) has a set-back trapezoidal construction.

5. Membrane filter plate according to one of claims 1, 2 or 3, characterized in that the sealing rim frame (16) and the carrier plate (10) are provided with corner feed and discharge bores (36, 44) respectively, which are in each case traversed by a preferably plastics material threaded sleeve (38) having a screw thread at both ends, the threaded discs (38) screwed on to the sleeve ends sealingly pressing together the sealing rim frame (16) and carrier plate (10).

6. Membrane filter plate according to claim 5, characterized in that the sealing rim frame (16) in each case has one passage (46) extending parallel to the carrier plate median plane (14) and which in the vicinity of the corner drain bores (44) communicates therewith and is in fluid connection via a plurality of transverse bores (48) with the surface of membrane (18) used for the application of filter cloth (22) or the like.

7. Membrane filter plate according to claim 5, characterized in that the corner feed screw couplings (36) in each case have a cloth screw coupling (42).

8. Membrane filter plate according to claim 7, characterized in that the cloth screw couplings in each case have a clamping disc (42) which can be screwed on to the threaded sleeve (38) in addition to the threaded discs (40).

9. Membrane filter plate according to claim 5, characterized in that the sealing rim frame (16) in an outer region of its inner surface facing the carrier plate (10) adjacent to the circumferential surface (50) thereof is constructed with a reduced thickness, whilst forming a set-back rim step (52), than in its area connecting on to the rim step (52) in the direction of the central region of the carrier plate (10) that the carrier plate (10) on its bearing face facing the sealing rim frame (16) has an edge slot (54), whose inner wall towards the central region of the carrier plate (10) is substantially aligned with the edge step (52) of the sealing rim frame (16) and whose outer wall (56) running substantially parallel to the circumferential surface (50) of sealing rim frame (16) engages behind the edge step (52) of frame (16) and that in the edge slot (54) is inserted a rim seal (58), which can be sealingly pressed against its outer wall (56), as well as the outer region of the inner surface of sealing rim frame (16) following on to the edge step (52).

10. Membrane filter plate according to claim 9, characterized in that the rim seal (58) is constructed as a sealing ring.

11. Membrane filter plate according to claim 9, characterized in that the bearing surface of the carrier plate (10) slopes in the direction of the carrier plate median plane (24) from the edge of outer wall (56) of rim slot (54) to the circumferential surface.

12. Membrane filter plate according to claim 5, characterized in that the rim seal (58) can be pressed against the bottom surface of rim slot (54).

* * * * *